United States Patent [19]
Gondhalekar

[11] Patent Number: 5,789,838
[45] Date of Patent: Aug. 4, 1998

[54] THREE-AXIS FORCE ACTUATOR FOR A MAGNETIC BEARING

[75] Inventor: Vijay Gondhalekar, New York, N.Y.

[73] Assignee: SatCon Technology Corporation, Cambridge, Mass.

[21] Appl. No.: 728,348

[22] Filed: Oct. 9, 1996

[51] Int. Cl.$^6$ ............................................. H02K 7/09
[52] U.S. Cl. ........................ 310/90.5; 310/74; 318/615
[58] Field of Search ......................... 308/10; 310/90.5, 310/263, 67, 74; 74/5.46, 572; 318/615

[56] References Cited

U.S. PATENT DOCUMENTS

| | | | |
|---|---|---|---|
| 3,902,659 | 9/1975 | Brinkmann et al. | 233/23 A |
| 4,000,929 | 1/1977 | Studer | 308/10 |
| 4,077,678 | 3/1978 | Studer et al. | 308/10 |
| 4,294,493 | 10/1981 | Sindlinger et al. | 308/10 |
| 4,316,394 | 2/1982 | Dohogne | 308/10 |
| 4,583,794 | 4/1986 | Takahara et al. | 308/10 |
| 4,668,885 | 5/1987 | Scheller | 310/90.5 |
| 5,101,130 | 3/1992 | Jayawant et al. | 310/90.5 |
| 5,200,049 | 4/1993 | Stevenson et al. | 204/298.22 |
| 5,211,546 | 5/1993 | Isaacson et al. | 417/356 |
| 5,216,308 | 6/1993 | Meeks | 310/90.5 |
| 5,355,042 | 10/1994 | Lewis et al. | 310/90.5 |

*Primary Examiner*—Clayton E. LaBalle
*Assistant Examiner*—Timothy A. S. Williams
*Attorney, Agent, or Firm*—David G. Conlin; William J. Daley, Jr.

[57] ABSTRACT

This invention features a three-axis force actuator that axially, radially and rotatably supports a bearing member for frictionless rotation about an axis of rotation generally coincident with a Z-axis. Also featured is a magnetic bearing having such an actuator. The actuator includes an inner member, a magnetic member and a pole assembly having a ring member and four pole extending therefrom. The poles are equi-angular spaced from each other and radially spaced about the Z-axis. The inner member extends along the Z-axis and is a highly magnetic permeable material. The magnetic member is formed about the inner member outer surface, extends along the Z-axis and is configured so one magnetic pole polarity is located at its outer surface and the other polarity pole is located at its inner surface. Preferably, the magnetic member is a radially magnetized permanent magnet. The inner surface of the ring member is magnetically coupled to the magnetic member and a face of each pole is coupled to the bearing member. The magnetic member, the pole assembly, the inner member and the bearing member cooperate to generate a magnetic field that radially and rotatably supports a rotating member secured to the bearing member. The actuator further includes a plurality of electromagnetic coils. Preferably, a coil is formed about each pole and at least 2 coils are formed about the inner member. When energized, the electromagnetic coils generate a modulated magnetic field that stabilizes the rotating member in the desired operational position.

23 Claims, 3 Drawing Sheets

THREE-AXIS FORCE ACTUATOR FOR A MAGNETIC BEARING

STATEMENT REGARDING FEDERALLY-SPONSORED RESEARCH

The U.S. Government has paid up a non-exclusive, non-transferable license to practice or have practiced for or on behalf of the United States this invention throughout the world as provided for by the terms of contract No. NAS8-38944 awarded by NASA.

FIELD OF INVENTION

This invention relates to magnetic bearings and magnetic suspension systems and more particularly to a three-axis force actuator for a highly compact integral radial and thrust magnetic bearing.

BACKGROUND OF THE INVENTION

Bearings are used to rotatable support a rotating shaft or rotating member so it is maintained in the proper alignment required for operation as well as to reduce frictional losses, noise and wear. Radial bearings allow free rotation of a rotating member or shaft while supporting the member and maintaining it in a preset position in a plane orthogonal to the axis of rotation. Thrust or axial bearings allow free rotation of a rotating member or shaft while supporting it and maintaining it in a preset position axially (i.e., resist forces along the axis of rotation).

Because of the differences between these two bearing types, it is common practice to provide a radial bearing when dealing with radial loadings and to provide a thrust bearing when dealing with axial loadings. An example of an apparatus having both radial and thrust magnetic bearings is described in U.S. Pat. No. 5,355,042.

There are however, a number of disadvantages associated with using separate thrust and radial bearings, particularly separate thrust and radial magnetic bearings. The presence of sperate bearings increases the overall length and weight of the apparatus using the bearings. This is a particular concern for gas turbine engines and satellite energy storage flywheels, where axial space is limited.

Separate bearings also increases complexity and the number of components as well as increasing the cost and weight of the overall magnetic bearing structure. Further for many applications, particularly high speed rotating systems (e.g., 35,000–50,000 rpm), large radial dimensions lead to high stresses and therefore potential earlier failure and/or shorter design life. One of the main causes of satellite failures is the failure of the bearings that rotatably support the energy storage flywheel.

Complexity and number of parts are increased because each magnetic bearing requires a biasing magnet/electromagnet mechanism that suspends the rotating member and resists external forces acting thereon. The magnetic bearings also require control electromagnetic coils to re-center the rotating member. In addition, each bearing would require position sensors and circuitry to operate the control coils to re-center the rotating member. Further, provisions would have to be made to power each of the electromagnetic coils and to dissipate the heat energy generated therefrom.

There is, therefore, a need for an integral axial and radial magnetic bearing assembly that is compact in size and which stabilizes and suspends a rotating member subject to both axial and radial moments/loadings.

SUMMARY OF THE INVENTION

It is, therefore, an object of the present invention to provide a three-axis force actuator for a magnetic bearing that rotatably supports a rotating member subjected to both radial and thrust loadings.

It is another object of the present invention to provide a magnetic bearing that is highly compact in size in comparison to know radial and axial magnetic bearings.

It is yet another object of the present invention to provide a magnetic bearing that is simple in construction and less costly in comparison to known magnetic bearings.

This invention features a novel three-axis force actuator, for an integral radial and axial magnetic bearing, that generates controllable forces in three orthogonal directions to radially, axially and rotatably support a rotating member. Also featured is an integral radial and axial magnetic bearing including such a force actuator. Such an integral radial and axial magnetic bearing is advantageous in that it is highly compact in size in comparison to known radial and axial magnetic bearings. Further such a magnetic bearing is simple in construction and less costly in comparison to known magnetic bearings.

In preferred embodiments, the three-axis force actuator includes an inner member, a magnetic member, four poles; and a plurality of control coils. The inner member is an elongated member formed from a material with a high magnetic permeability such as iron. For purposes of this description, the inner member's central axis is defined as the Z-axis, which also will be the axis of rotation for a rotating bearing member disposed about the inner member. The bearing member is secured to the rotating member. Further the inner member may be a hollow cylindrical member. When the magnetic bearing of the instant invention is used to rotatably support a flywheel, the hollow member may be secured to a shaft.

The magnetic member is an annular member that is mounted in tight fitting relation to the inner member so there is no air gap or a relatively small air gap formed therebetween. For example, the magnetic member may be configured so the "air gap" between the magnetic member and the inner member is relatively small compared to the radial dimension of the magnetic member. Preferably, the magnetic member is mounted so its axial midpoint is proximate the axial midpoint of the inner member and extends an equal amount on either side of the midpoint along the inner member long axis.

The magnetic member is magnetized so all magnetic poles of one polarity (e.g., south pole) are adjacent the inner member and the other magnetic polarity poles face the rotating member. Preferably, the magnetic member is a single radially magnetized permanent magnet that forms an annular ring shaped member. The inner diameter of the annular ring is established so the annular ring is tightly secured to the inner member so there is no air gap or a relatively small air gap formed therebetween as provided above.

The pole assembly is a ring or annular-shaped member with four poles that are equi-angular spaced and that project radially outwardly from the annular member. Additionally, the annular shaped member is mounted in tight fitting relation on the magnetic member so no air gap is formed therebetween. In this way, the lines of magnetic flux directed out from the magnetic member are channeled through the radially projecting poles. The pole assembly, including the four poles, is formed from a material with a high magnetic permeability such as iron.

3

The poles also project radially outwardly so as to be equidistant from the axis of rotation. Thus, the poles are separated from the inside surface of the rotating member or its corresponding rotating bearing member by a small air gap. Preferably, the distance from the axis of rotation is such as to minimize the size of the air gap and thus minimize magnetic field losses.

The inner member, magnetic member, pole assembly including the poles, and the bearing member, as well as the air gaps between the bearing member and the poles and inner member, cooperate so as to establish a magnetic circuit. The magnetic fields established between the poles and bearing member and between the bearing member and the ends of the inner member axially, radially and rotatably support and suspend the bearing member and correspondingly the rotating member.

The magnetic bearing of the instant invention further includes, a plurality of electromagnetic coils that modulate the magnetic field being generated by the magnetic member. An electromagnetic coil is disposed at each pole (e.g., four coils) that, when energized, modulates the magnetic field which radially supports the rotating member. Also, there is at least 2 coils arranged on and about the inner member that, when energized, modulate the-magnetic field which axially supports the rotating member. The electromagnetic coils preferably are separately and individually energized to generate a variable magnetic field axially and/or radially to stabilize the rotating member in the desired operational position.

BRIEF DESCRIPTION OF THE DRAWING

For a fuller understanding of the nature and desired objects of the present invention, reference should be made to the following detailed description taken in conjunction with the accompanying drawing figures wherein like reference characters denote corresponding parts throughout the several views and wherein.

DESCRIPTION OF THE PREFERRED EMBODIMENT

Figure 1:
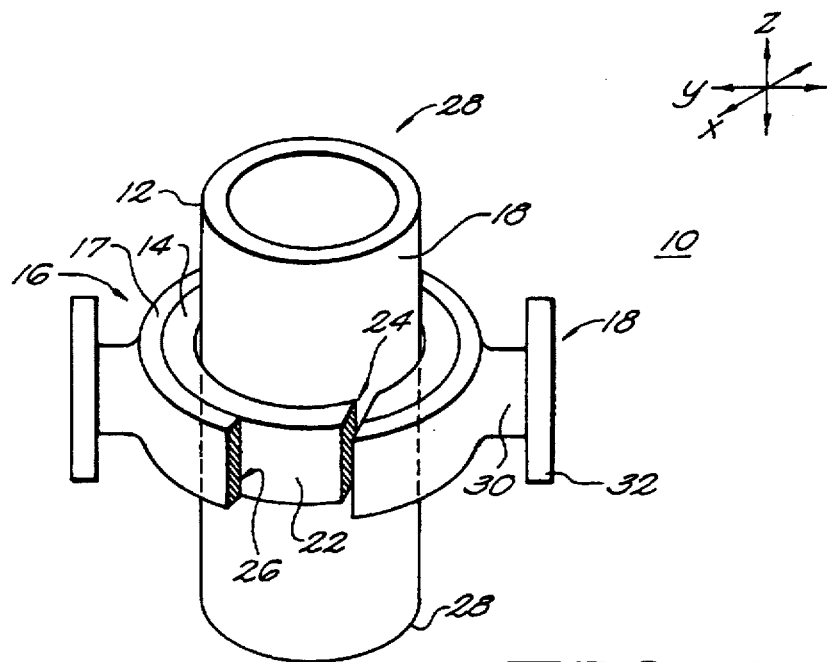
FIG. 1 is a perspective view with a partial broadway of a three-axis force actuator for a magnetic bearing of the instant invention.

Referring now to the various figures of the drawing wherein like reference characters refer to like parts, there is shown in FIG. 1 a three-axis force actuator 10 of a magnetic bearing 100 (FIG. 2) of the instant invention. The figure also includes a partial breakaway to better illustrate the structural and functional interrelationships of the force actuator's components.

The three-axis force actuator 10 supplies the radial and axial D.C. bias forces and the variable control magnetic fluxes that rotatably supports the rotating member and stabilize it in a desired operational position. As hereinafter described, the force actuator 10 is configured so it develops forces along three orthogonal directions (i.e., along the X/Y/Z axis as shown in FIG. 1) by means of the generated magnetic fields, to stabilize the rotating member. As indicated above, the Z-axis corresponds to the centerline of the inner core 12 and the axis of rotation for the rotating member.

While the three-axis actuator 10 being illustrated is oriented so the Z-axis corresponds to the inner core's centerline, and is coincident with the earth's gravity axis—i.e. in the direction of gravitational force, this is not a limitation. The three-axis actuator 10 may be orientated so either the X or Y axis is coincident with the earth's gravity axis. In these other orientations, the relative size of the respective pole piece and control coils are adjusted so the magnetic bearing can carry the weight of the rotating member (e.g. flywheels) as well as resist loads being imposed.

The force actuator 10 includes an inner core 12, a magnetic piece 14, and a pole assembly 16. Preferably, as shown in FIG. 3, the pole assembly 16 is configured with four poles 18. However, for clarity, only two of the four poles 18 are shown in FIG. 1. Also for purposes of clarity, the electromagnetic coils generating the control flux also are not illustrated on FIG. 1, but rather they are shown on FIGS. 2–3.

The inner core 12 preferably is a hollow cylindrical member of a magnetically permeable material such as iron. The inner core 12 is arranged so its long or central axis is essentially coincident with the Z-axis and, correspondingly, the axis of rotation for the rotating member 102 (see FIGS. 2,4). The inner core can have other geometric cross-sectional shapes, such as a hexagonal shape, that is appropriate for the use and speed of rotation. The hollow region within the inner core 12 can be occupied by a non-magnetic material, for example, a stainless steel mounting shaft.

The magnetic piece 14 is disposed about and abuts the outer surface 18 of the inner core 12. It also extends a predetermined distance along the length of the inner core. In this way, the magnetic piece 14 essentially forms an annular or ring shaped region of magnetic material about a portion of the inner core outer surface 18. The inner surface 24 of the magnetic piece 14 is in close or tight fitting contact with the outer surface 18 of the inner core 12 so there is no air gap therebetween.

The magnetic piece 14 also is arranged on the inner core 12 so the axial midpoint of the magnetic piece is proximate or coincident with the axial midpoint of the inner core. Further, the magnetic piece 14 extends equi-distantly about its midpoint along the length of the inner core 12. In this way, the magnetic flux being generated and flowing in both axial directions is essentially equalized by the established geometry.

The pole assembly 16 includes a ring shaped portion 17 and four poles 18 that extend therefrom as more clearly seen in FIG. 3. The ring shaped portion 17 is disposed circumferentially about the magnetic piece 14 and along the axial length of the magnetic piece. Preferably, the inner surface 26 of the ring shaped portion 17 is in close or tight fitting contact with the magnetic piece outer surface 22 so there is no air gap therebetween. Alternatively, they are fitted together so the air gap formed therebetween is relatively small as compared to the radial dimensions of the magnetic member.

As indicated above, and as shown in FIG. 3, the four poles 18 are equiangular spaced from each other. The radial projections through the centerline of each pole 18 are also orientated so they are essentially coincident with the X and Y-axis for the force actuator 10.

Each pole 18 includes a radial arm portion 30 and a face portion 32 at its outer end. The length of the arm portion 30 is established so the face portion 32 is spaced away from the opposing inner surface of the rotating member 102 (FIG. 2) and to minimize the air gap therebetween. Further, the outer surface of the face portion 32 is configured to complement the opposing inner surface of the rotating member 102 so as to provide a uniform air gap. For example, the face portion 32 may be curved to complement a curved inner surface of the rotating member as illustrated in FIG. 3.

The magnetic piece 14 is a radially magnetized permanent magnet that is, e.g., its north pole is at its outer surface 22 and the south pole is at its inner surface 24. As such, most of the magnetic flux from the magnetic piece 14 flows or emanates radially outwardly to the surrounding ring portion 17 of the pole assembly 16. Wherever a specific pole polarity is used herein to describe the instant invention, it shall not be considered a limitation. Rather, the actuator 10 may be configured so the pole polarities are reversed from that described while maintaining the described effect.

The very low reluctance path of the material forming the pole assembly 16 channels this flux and concentrates the flux at the poles 18. Since the radial projections of the poles 18 are essentially coincident with the x,y axes, the poles also concentrate and channel the magnetic flux from the permanent magnet outwardly along the x,y axes. The permanent magnet may be any suitable magnetic material but samarium cobalt, Neobyium-Iron-Boron or other high energy density magnetic materials are preferred. In an exemplary embodiment, the magnetic piece is a radially magnetized Neobyium-Iron-Boron permanent magnet having an energy or BH product of 39 MGOe.

Figure 2:
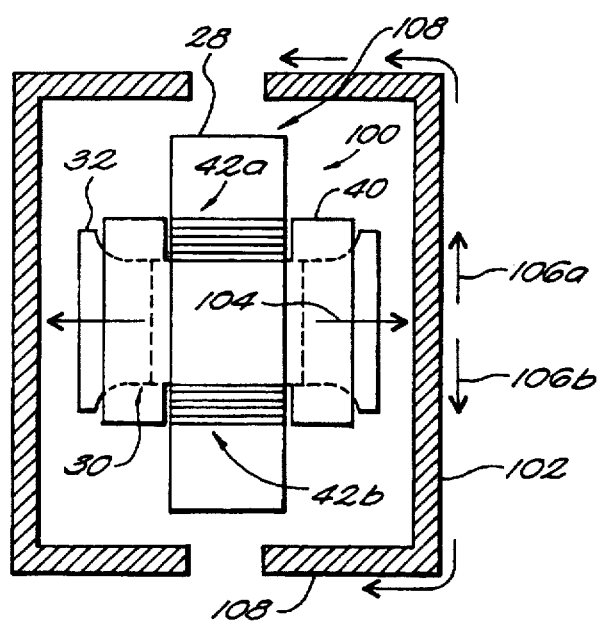
FIG. 2 is a elevation view of part of a magnetic bearing with the three-axis force actuator of FIG. 1.
Figure 3:
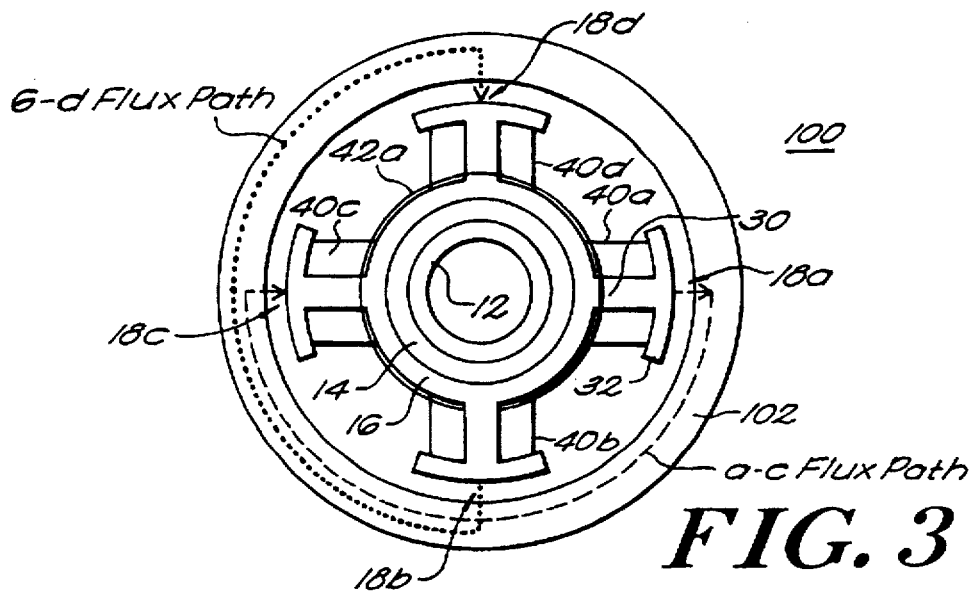
FIG. 3 is a cross sectional plan view of the magnetic bearing of FIG. 2.

Referring also to FIG. 2, and as indicated in the foregoing, the steady state, bias or DC magnetic flux from the magnetic piece 14 is channeled by the pole assembly 16 and concentrated by each pole so the flux flows radially outward in direction 104 through each pole. The lines of flux extending outwardly from each of the poles 18 are mushroom like. Thus the magnetic flux lines run axially in both directions 106a,b through the rotating member 102 and thence into the ends 108 thereof. As a result, a south pole polarity is induced into the rotating member 102 at and along the inner surface adjacent the poles 18. Correspondingly, the magnetic piece 14 cooperates with the inner member 12 so a south pole polarity is established at both ends 28 of the inner member. As a result, a north polarity is induced at and along the inner surface of the ends 108 of the rotating member.

Figure 4:
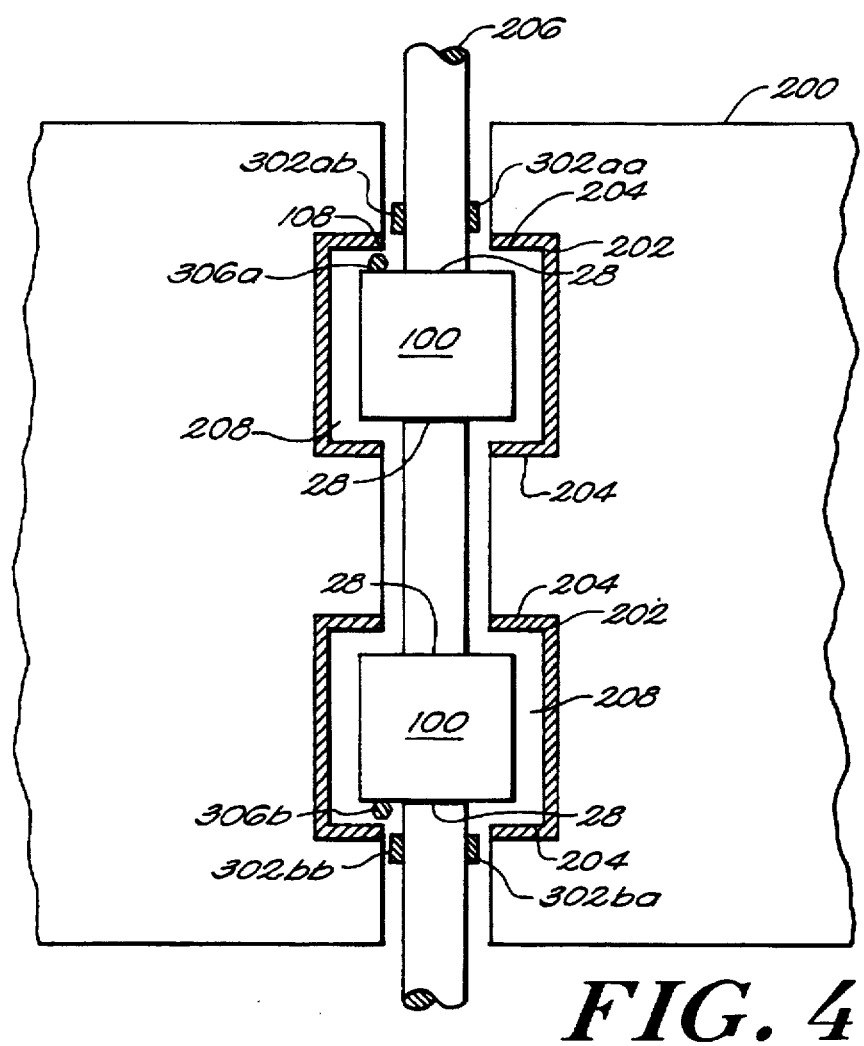
FIG. 4 is a schematic view of a flywheel rotatably supported by the magnetic bearing and force actuator of FIGS. 1–3.

The ends 108 are flange like members that are perpendicular to the Z-axis. As also shown in FIG. 4, the ends also may comprise the ends 204 of the insert 202 in the rotating member 200. The ends 108 of the rotating member 102 are closely spaced from the inner core ends 28 to minimize the air gap between these ends. This establishes a flux path between the ends 108,28.

In sum, the axial and radial bias generated by the magnetic piece establishes a north-south polarity between the ends 10 of the rotating member and the ends 28 of the inner core 12. A north-south polarity also is thereby established between the face portion 32 of each pole 18 and the inner surface of the rotating member that opposes the face portion. Thus, the rotating member is axially and radially suspended or supported by the bias magnetic flux from the permanent magnet comprising the magnetic piece.

Referring also to FIG. 3, an electrical coil is wound about each radial arm portion 30 thereby forming a plurality of electromagnetic coils 40a–d that each control the net radial flux being channeled through each of the poles 18. Two electrical coils, electromagnetic coils 42a,b, also are wound about the inner core 12 to control the net axial flux in the inner core 12. For purposes of this discussion, net flux shall be understood to mean the resultant of the combination of the steady state or bias radial or axial flux generated by the magnetic piece 14 and the variable control radial or axial flux generated by the appropriate electromagnetic coil(s) 40,42.

The above described arrangement of the electromagnetic coils 40,42 on the arm portion 30 and the inner core 12, results in the immediate coupling of the control flux with the magnetically permeable material (e.g., iron) which carries the bias flux. Thus, the control flux and bias flux use the same magnetic circuit which yields a magnetic bearing 100 that is more compact in size in comparison to prior art magnetic bearings. The flux paths for the electromagnetic coils 40a–d controlling the net radial flux are illustrated in FIG. 3.

Because of the inverse relationship of magnetic force over distance, it is possible for a rotating member 102 to be drawn radially to one side or the other within the bearing housing even in the presence of a constant magnetic field. This is sometimes referred to as the "negative spring" effect. To counteract this effect as well as to re-center the rotating member 102 radially or axially, each of the control coils 18 are energized so a variable electromagnetic field can be generated. When so energized, the magnetic field established by the electromagnetic coils 40,42, when superimposed on the bias magnetic field established by the magnetic piece 14, causes the rotating member 102 to return to and be maintained in its desired operational position. In this way, the magnetic bearing 100 of the instant invention can effect a change in the position of the rotating member 102 as well as stabilize the operational position of rotating member. Since a magnetic bearing is a non-contact bearing, the foregoing is accomplished while avoiding mechanical abrasion and heat buildup due to bearing friction.

Typically, conventional position sensors and conventional control circuitry are provided to sense the position of the rotating member 102 and to control the energization of the electromagnetic control coils 40,42. In operation, when the sensors determine that the rotating member 102 has moved from it desired radial and/or axial position, the control circuitry energizes each of the electromagnetic control coils 40,42 so as to generate the magnetic field that returns the rotating member to and maintains it in the desired operational position.

In sum, an integral thrust and radial magnetic bearing 100 having the three-axis force actuator 10 of the instant invention axially, radially and rotatably supports a rotating member 102, such as a flywheel 200 (FIG. 4). In contrast to known prior art magnetic bearings, the three-axis force actuator 10 of the present invention uses a single permanent magnet, in conjunction with an inner core 12 and pole assembly 16 of a highly magnetically permeable material, to develop the biasing or steady state magnetic forces required to support the rotating member both axially and radially.

Additionally, the electromagnetic control coils 40,42 are wound on the inner core 12 and pole assembly 16 so the variable control flux is immediately coupled to the magnetically material of the inner core and pole assembly. The pole assembly 16 also includes a plurality of poles 18, preferably four poles, so the net flux (i.e., bias flux+control flux) is channeled through the poles. The result is a magnetic bearing that is compact in size, requires less parts and is simple in construction in comparison to prior art magnetic bearings.

There is shown in FIG. 4, a schematic view of a rotating flywheel 200 having two magnetic bearings 100 according to the instant invention for axially and radially rotatably supporting the flywheel (i.e., the rotating member). Reference should be made to FIGS. 1–3 for those components/parts of the three axis force actuator 10 comprising the magnetic bearing 100 not specifically shown in FIG. 4. While a flywheel application is illustrated, this is not a limitation. It is within the scope of the present invention that the herein described magnetic bearings 100 can be used to rotatably support a rotating member of any apparatus that can be configured with such a bearing, e.g., momentum wheels, gas turbine engine rotors and encapsulated pumps.

In the illustrated embodiment, the inner core 12 of each magnetic bearing 100 is attached to a non-rotating shaft 206 and is disposed in one of the pockets 208 formed in the interior of the flywheel 200. The three axis actuator 10 preferably is attached to the shaft 206 so it is centered at the axial midpoint of each pocket 208. Also, the flywheel preferably is configured with an insert 202 of a highly magnetic permeable material to define the pocket 208. As described above, the insert 202 comprises part of the magnetic circuit of the magnetic bearing.

In operation, the flywheel 200 rotates about the shaft 206, while the shaft and magnetic bearings 100 remain fixed. As such, the magnetic bearings 100 suspend and rotatably support the flywheel 200 as it rotates about the shaft 206. The total or net flux being generated by the magnetic piece 14 (FIGS. 1–3) and the electromagnetic coils 40,42 of each of the bearings 100 is sufficient to stabilize the flywheel 200 so it is returned to and/or maintained in the desired operational position.

The shaft 206, or structure on which the three force actuator 10 for each magnetic bearing 100a,b is mounted, is made of a material having a relatively low permeability as compared to the rest of the iron/steel of the magnetic bearing. Preferably, the ratio of the permeabilities is about 10 to 1 or higher.

Figure 5:
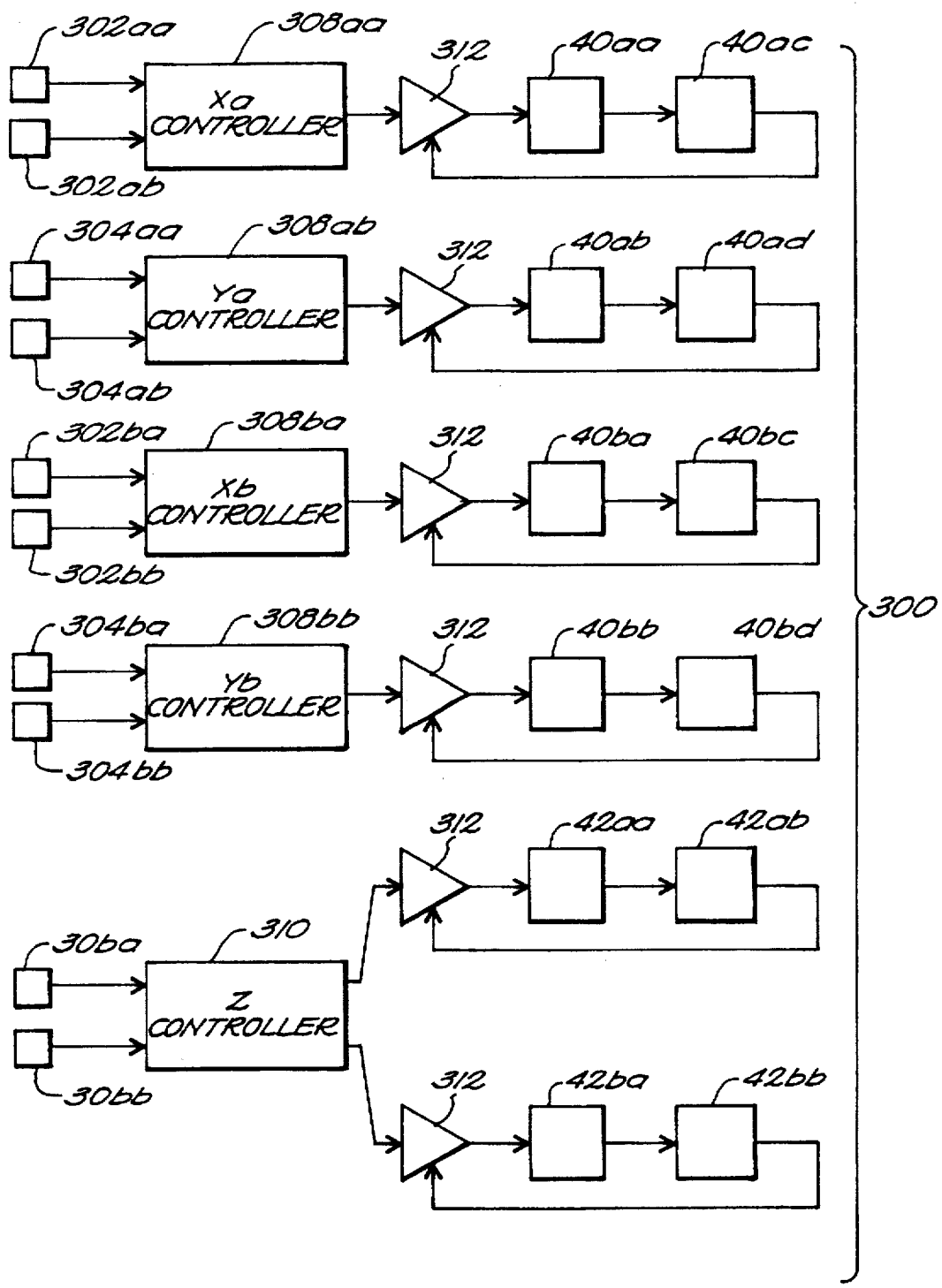
FIG. 5 is an illustrative block diagram of the control circuitry for the magnetic bearings of FIG. 4.

There is shown in FIG. 5 a block diagram of the circuitry 300 that controls the energization level of the control coils for a pair of magnetic bearings 100a,b that support a rotating flywheel 200. Reference should also be made to FIGS. 1–4 for specific components/structure of the three-axis force actuator 10, a magnetic bearing and the flywheel. The following numbering convention shall be used to relate the components of the instant block diagram to that illustrated and in discussed in FIGS. 1–3. The first alpha character following a number used in any of FIGS. 1–3 shall be used to identify the components relating to a specific magnetic bearing (e.g., "10a" is the three-axis force actuator for one magnetic bearing 100a). A second alpha character is used when it is necessary to the understanding of the invention to identify the specific component of a magnetic bearing when the bearing has multiples of such components.

Each magnetic bearing includes at least one and preferably two position sensors, respectively, for each of the X-axis and Y-axis and at least one position sensor for the Z-axis. The X-axis, Y-axis and Z-axis position sensors are mounted orthogonal to each other so positional deviations of the rotating flywheel 200, with respect to each magnetic bearing, along each axis are detected. The outputs from the sensors, as discussed below, are utilized to return and maintain the rotating flywheel in its desired orientation.

The two X-axis position sensors 302aa,302ab are provided to detect the relative position of the flywheel 200 in the X-axis with respect to one of the magnetic bearings, the upper magnetic bearing 100a. The output of these X-axis position sensors 302aa,302ab is continuously fed to a controller, $X_a$ controller 308aa, such as an analog or digital control circuit known to those skilled in the art. The $X_a$ controller 308aa evaluates the sensor outputs and controls an amplifier 312 so as to continuously adjust the level of energization (i.e., increase or decrease) that drives the X-axis control coils 40aa,40ac for a pair of opposed poles 18aa, 18ac.

In operation, when these X-axis position sensors 302aa, 302ab determine that the rotating flywheel 200 has moved from its desired operational position, the control circuitry 300 continuously adjusts the level of energization of the X-axis control coils 40aa, 40ac. This in turn generates the magnetic field that returns the rotating flywheel 200 to, and maintains it in, the desired operational position.

Correspondingly, the two Y-axis position sensors 304aa, 304ab are provided to detect the relative position of the flywheel 200 in the Y-axis with respect to the upper magnetic bearing 100a. The output of these Y-axis position sensors 304aa,304ab is continuously fed to a controller, $Y_a$ controller 308ab. The $Y_a$ controller 308ab evaluates the sensor outputs and controls an amplifier 312 so as to continuously adjust the level of energization that drives the Y-axis control coils 40ab,40ad for the other pair of opposed poles 18ab, 18ad. As with the X-axis position sensors, when the Y-axis position sensors 304aa,304ab detect a positional deviation in the Y-axis the $Y_a$ controller adjust the energization level of the Y-axis control coils. In this way, the rotating flywheel 200 is returned to and maintained in its desired operational position.

Similarly, the other magnetic bearing, the lower magnetic bearing 100b, includes two X-axis position sensors 302ba, 302bb, two Y-axis position sensors 304ba,304bb that continuously provide outputs to the $X_b$ controller 308ba and $Y_b$ controller 308bb, respectively. The $X_b$ controller 308ba and $Y_b$ controller 308bb evaluate the respective sensor outputs and each controls an amplifier 312 so as to continuously adjust the level of energization that, respectively, drives the X-axis control coils 40ba,40bc and Y-axis control coils 40bb,40bd of the lower magnetic bearing 100b. As with the upper magnetic bearing 100a, when positional deviations are detected the appropriate control coils are energized to return and maintain the rotating flywheel in its desired orientation.

As indicated above, there are at least two Z-axis position sensors 306a,b, at least one sensor for each of the magnetic bearings 100a,b. The outputs from the two Z-axis position sensors 306a,b are continuously fed to a controller, Z controller 310 that evaluates the outputs of the Z-axis position sensors and controls the outputs levels of two amplifiers 312. The amplifiers 312 are controlled so as to continuously adjust the level of energization that drives the respective Z-axis control coils 42aa,42ab of the upper magnetic bearing 100a and the Z-axis control coils 42ba, 42bb of the lower magnetic bearing 100b.

In operation, when the Z-axis position sensors 306a,b determine that the rotating flywheel 200 has moved from its desired axial operational position, the control circuitry 300 continuously adjusts the level of energization of the pair of Z-axis control coils for each magnetic bearing. This in turn generates the magnetic field that returns the rotating flywheel 200 to, and maintains it in, the desired axial operational position.

Although the control circuitry for a two magnetic bearing assemblage is illustrated, this is not a limitation. It is within the scope of the instant invention for a single magnetic bearing as well as multiple magnetic bearings to be used to rotatably support a rotating member. Further, the control circuitry is adaptable so it can control the control coils of single and multiple magnetic bearings. For example, for single and multiple bearing applications, the control circuitry is configured so as to be responsive to magnetic bearings each having at least one and preferably two position sensors, respectively, for each of the X-axis and Y-axis.

For controlling movement in the Z-axis, there should be at least one and preferably at least two position sensors provided to detect and determine the axial movement of the rotating member. Further, the control circuitry is configured so it controls all the Z-axis control coils responsive to the movement detected by the at least one/at least two Z-axis position sensors. It also is within the scope of the instant invention for the X-axis, Y-axis and Z-axis control coils, individually or in combination, to be normally and continuously energized.

Although a preferred embodiment of the invention has been described using specific terms, such description is for illustrative purposes only, and it is to be understood that changes and variations may be made without departing from the spirit or scope of the following claims.

What is claimed is:

1. A three-axis force actuator that axially, radially and rotatably supports a bearing member for frictionless rotation about an axis of rotation generally coincident with a Z-axis, the actuator comprising:
   an inner member elongated about the Z-axis, having an outer surface and being of a magnetically permeable material, where said inner member being axially magnetically coupled to the bearing member;
   a magnetic member being formed about the inner member outer surface and along the Z-axis, said magnetic member being configured so all magnetic poles of one polarity are located at an outer surface of the magnetic member and so the other polarity poles are located at a magnetic member inner surface, where the magnetic member inner surface is adjacent the inner member outer surface, said magnetic member being magnetically coupled to said inner member;
   a pole assembly having a ring member and four pole portions extending therefrom, each pole portion being equi-angular spaced from each other about the Z-axis, where an inner side of the ring member is adjacent to the magnetic member outer surface and magnetically coupled to said magnetic member and where a face of each pole portion is radially magnetically coupled to the bearing member; and
   wherein said magnetic member, said pole assembly, said inner member and the bearing member cooperate so as to generate at least one magnetic field to axially, radially and rotatably support the bearing member.

2. The actuator of claim 1, wherein said inner member is a hollow cylindrical member and said magnetic member is an annular ring-shaped member.

3. The actuator of claim 2, wherein said inner member is made from iron.

4. The actuator of claim 1, wherein said magnetic member is a permanent magnet.

5. The actuator of claim 2, wherein said magnetic member is a radially magnetized permanent magnet.

6. The actuator of claim 1, further comprising a plurality of electromagnetic coils that modulates the magnetic field being generated from said magnetic member for axially, radially and rotatably supporting the bearing member.

7. The actuator of claim 6, wherein one electromagnetic coil is formed about each pole portion to modulate the magnetic field generated for radially supporting the rotating member, and wherein at least 2 electromagnetic coils are arranged on said inner member to modulate the magnetic field generated for axial support of the bearing member.

8. The actuator of claim 6, wherein the face of each pole portion is spaced from an opposing surface of the bearing member so as to minimize the air gap between the pole portion surface and the bearing member opposing surface.

9. The actuator of claim 6, wherein the face of each pole portion is configured to complement the bearing member opposing surface.

10. An integral axial and radial bearing that axially, radially and rotatably supports a rotating member for frictionless rotation about an axis of rotation generally coincident with a Z-axis, the magnetic bearing comprising at least one rotor section secured to the rotating member and at least one three-axis force actuator, each actuator including:
    an inner member elongated about the Z-axis, having an outer surface and being of a magnetically permeable material, where said inner member being axially magnetically coupled to the at least one rotor section;
    a magnetic member being formed about the inner member outer surface and along the Z-axis, said magnetic member being configured so one polarity of magnetic poles are located at an outer surface of the magnetic member and so the other polarity poles are located at a magnetic member inner surface, where the magnetic member inner surface is adjacent the inner member outer surface, said magnetic member being radially magnetically coupled to said inner member; and
    a pole assembly having a ring member and four pole portions extending therefrom, each pole portion being equi-angular spaced from each other about the Z-axis, where an inner surface of the ring member is adjacent to the magnetic member outer surface and magnetically coupled to said magnetic member and where a face of each pole portion is radially magnetically coupled to the at least one rotor section; and
    wherein said magnetic member, said pole assembly, said inner member and the at least one rotor section cooperate so as to generate at least one magnetic field to axially, radially and rotatably support the rotating member.

11. The integral axial and radial bearing of claim 10, wherein said inner member is a hollow cylindrical member and said magnetic member is an annular ring-shaped member.

12. The integral axial and radial bearing of claim 11, wherein said inner member is made from iron.

13. The integral axial and radial bearing of claim 10, wherein said magnetic member is a permanent magnet.

14. The integral axial and radial bearing of claim 11, wherein said magnetic member is a radially magnetized permanent magnet.

15. The integral axial and radial bearing of claim 10, further comprising a plurality of electromagnetic coils that modulates the magnetic field being generated from said magnetic member for axially, radially and rotatably supporting the rotating member.

16. The integral axial and radial bearing of claim 15, wherein one electromagnetic coil is formed about each pole portion to modulate the magnetic field generated for radially supporting the rotating member, and wherein at least 2 electromagnetic coils are arranged on said inner member to modulate the magnetic field generated for axial support of the rotating member.

17. The integral axial and radial bearing of claim 15, wherein the face of each pole portion is spaced from an opposing surface of the at least one rotor section so as to minimize the air gap between each pole and the opposing surface.

18. The integral axial and radial bearing of claim 15, wherein the face of each pole portion is configured to complement the opposing surface.

19. A three-axis force actuator that axially, radially and rotatably supports a bearing member for frictionless rotation about an axis of rotation generally coincident with a Z-axis, the actuator comprising:

an inner member elongated about the Z-axis, having an outer surface and two ends and being of a magnetically permeable material, where both ends of said inner member being axially magnetically coupled to the rotating member;

a magnetic member being formed about the inner member outer surface and along the Z-axis, said magnetic member being configured so all magnetic poles of one polarity are located at an outer surface of the magnetic member and so the other polarity poles are located at a magnetic member inner surface, where the magnetic member inner surface is adjacent the inner member outer surface, said magnetic member being radially magnetically coupled to said inner member;

a pole assembly having a ring member and a plurality of pole portions extending therefrom, each pole portion being equi-angular spaced from each other about the Z-axis, where an inner side of the ring member is adjacent to the magnetic member outer surface and magnetically coupled to said magnetic member and where a face of each pole portion is magnetically coupled to the rotating member;

wherein said magnetic member, said pole assembly, said inner member and the bearing member cooperate so as to generate axial and radial bias magnetic flux that respectively axially, radially and rotatably support the bearing member;

a plurality of electromagnetic coils;

wherein one electromagnetic coil is formed about each pole portion to generate a control flux that adds to or subtracts from the radial bias magnetic flux from each pole portion so as to adjust the magnetic fields that rotatably support the bearing member; and wherein at least two electromagnetic coils are arranged on said inner member, at least one coil being disposed on either side of said magnetic member, said at least two electromagnetic coils generating an axial control flux that adds to or subtracts from the axial bias magnetic flux that flows between said inner member and the bearing member.

20. The actuator of claim 19, wherein the face of each pole portion is spaced from an opposing surface of the bearing member so as to minimize the air gap therebetween and wherein the ends of said inner member are spaced from opposing end surfaces of the bearing member so as to minimize the air gap therebetween.

21. The actuator of claim 7, wherein:

the electromagnetic coils formed about two opposing pole portions are arranged so the position of the bearing member along one axis is controlled by adding control flux generated by the electromagnetic coil of one of the pole portions to the bias flux from that pole portion and by subtracting control flux generated by the electromagnetic coil of the other pole portion from the bias flux from the other pole portion, whereby the electromagnetic coils formed about each of the pole portions controls the position of the bearing member along two axis orthogonal to each other; and the at least two electromagnetic coils arranged on the inner member are arranged so at least one electromagnetic coil is disposed on either side of said magnetic member and so the axial position of the bearing member is controlled along the Z-axis by control flux generated by the at least two electromagnetic coils that is added to or subtracted from axial bias flux passing between said inner member and the bearing member.

22. The integral axial and radial bearing of claim 16, wherein:

the electromagnetic coils formed about two opposing pole portions are arranged so the position of the rotating member along one axis is controlled by adding control flux generated by the electromagnetic coil of one of the pole portions to the bias flux from that pole portion and by subtracting control flux generated by the electromagnetic coil of the other pole portion from the bias flux from the other pole portion, whereby the electromagnetic coils formed about each of the pole portions controls the position of the rotating member along two axis orthogonal to each other; and the at least two electromagnetic coils arranged on the inner member are arranged so at least one electromagnetic coil is disposed on either side of said magnetic member and so the axial position of the rotating member is controlled along the Z-axis by control flux generated by the at least two electromagnetic coils that is added to or subtracted from axial bias flux passing between said inner member and the at least one rotator section.

23. The integral axial and radial bearing of claim 10, wherein there are a plurality of rotor sections and a plurality of three axis force actuators, one force actuator for each rotor section.

* * * * *